(No Model.) 7 Sheets—Sheet 1.
C. B. BOYER.
COMBINED AUTOMATIC MONEY CHANGER AND CASH REGISTER.
No. 462,889. Patented Nov. 10, 1891.

Witnesses
C. T. Hallet.
Edward E. Longan

Inventor
C. B. Boyer.
By his Attorneys Higdon & Higdon

THE NORRIS PETERS CO., PHOTO-LITHO., WASHINGTON, D. C.

(No Model.) 7 Sheets—Sheet 2.
C. B. BOYER.
COMBINED AUTOMATIC MONEY CHANGER AND CASH REGISTER.
No. 462,889. Patented Nov. 10, 1891.

(No Model.) 7 Sheets—Sheet 3.
C. B. BOYER.
COMBINED AUTOMATIC MONEY CHANGER AND CASH REGISTER.
No. 462,889. Patented Nov. 10, 1891.
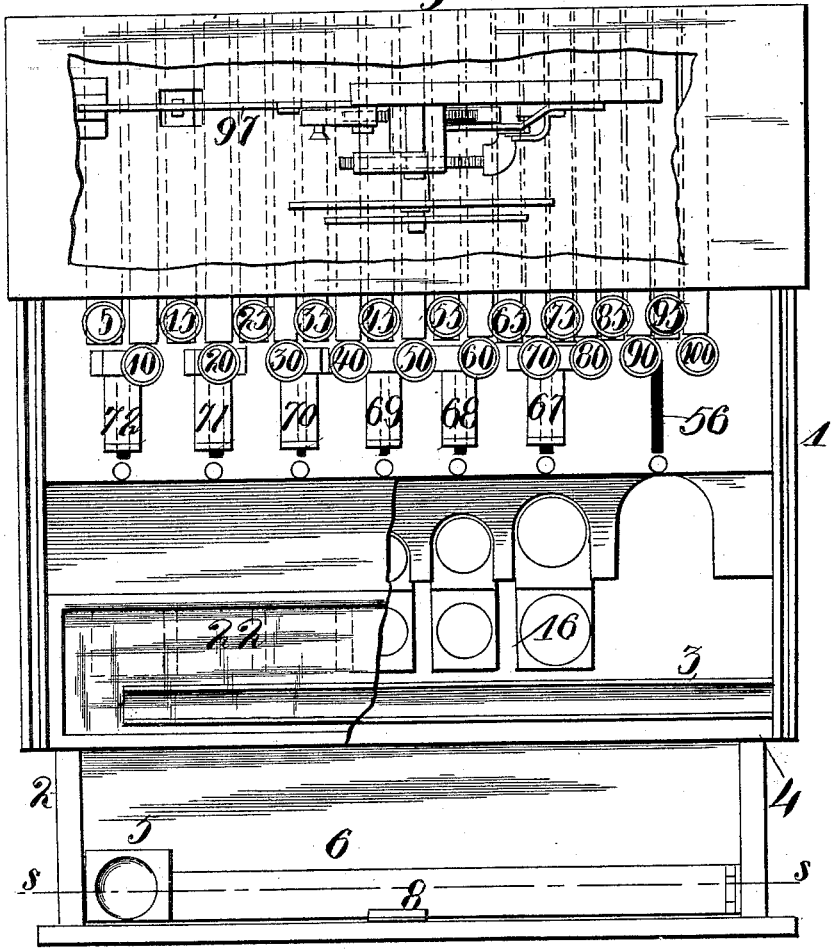
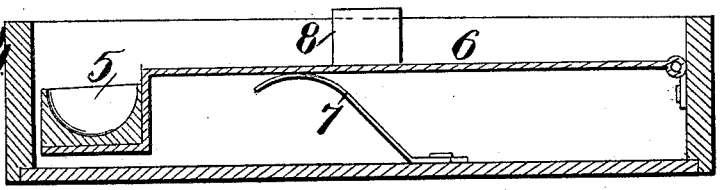
Witnesses
Inventor
C. B. Boyer.
By his Attorneys

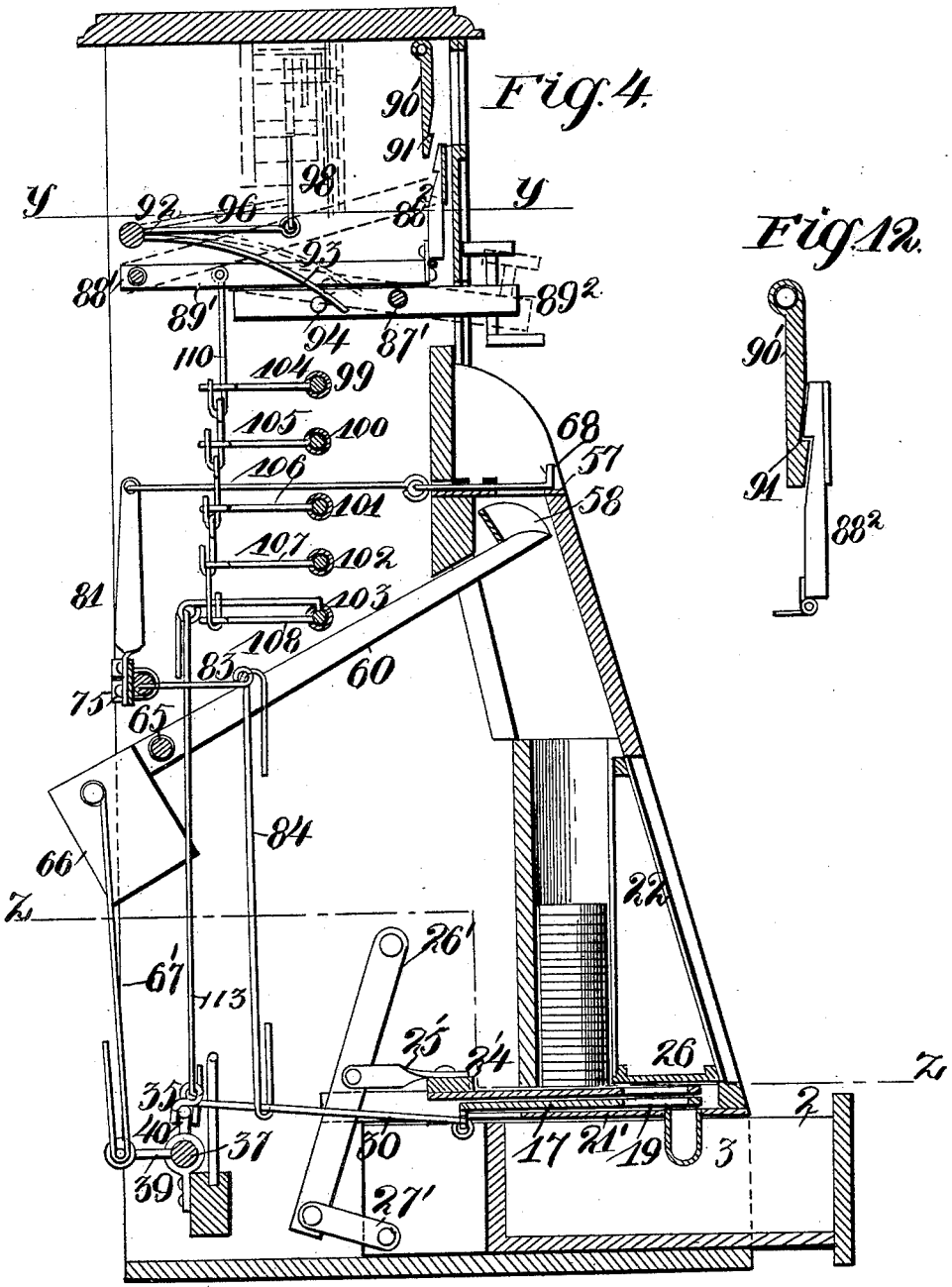

(No Model.) 7 Sheets—Sheet 5.
C. B. BOYER.
COMBINED AUTOMATIC MONEY CHANGER AND CASH REGISTER.
No. 462,889. Patented Nov. 10, 1891.
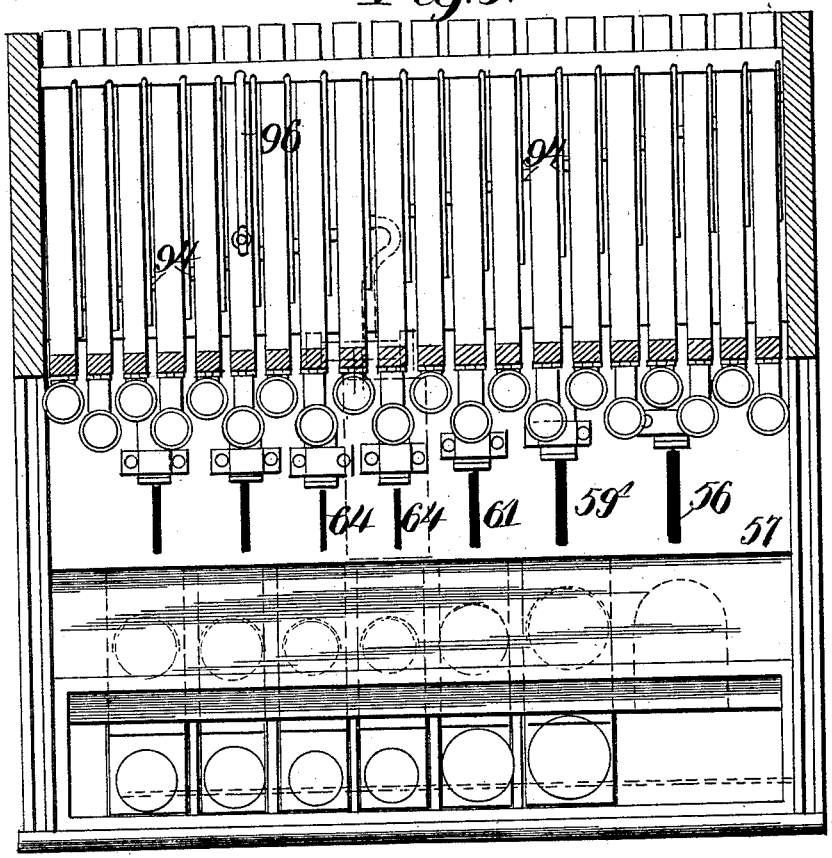
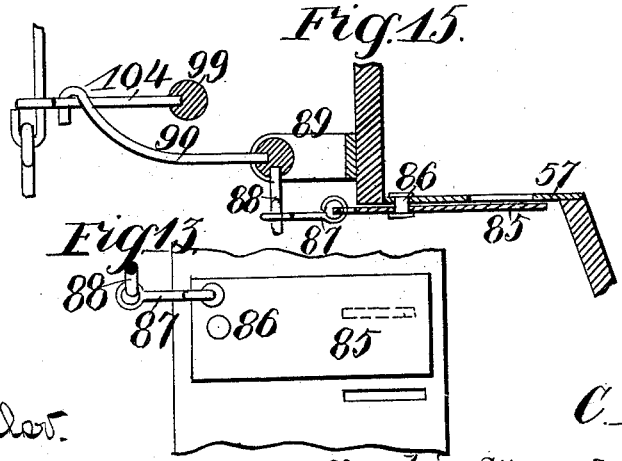
Witnesses
Inventor
C. B. Boyer.
By his Attorneys (No Model.)   7 Sheets—Sheet 6.

C. B. BOYER.
COMBINED AUTOMATIC MONEY CHANGER AND CASH REGISTER.

No. 462,889.   Patented Nov. 10, 1891.

Witnesses   Inventor
C. B. Boyer
By his Attorneys Higdon & Higdon (No Model.) 7 Sheets—Sheet 7.
C. B. BOYER.
COMBINED AUTOMATIC MONEY CHANGER AND CASH REGISTER.
No. 462,889. Patented Nov. 10, 1891.
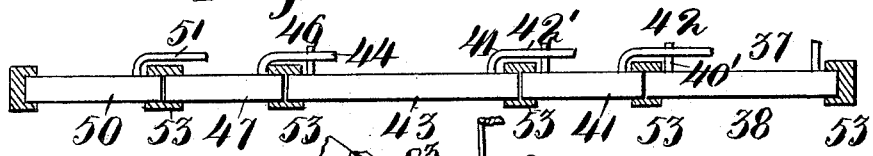
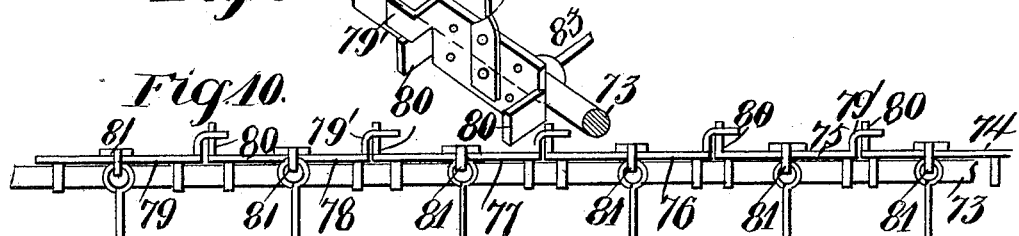
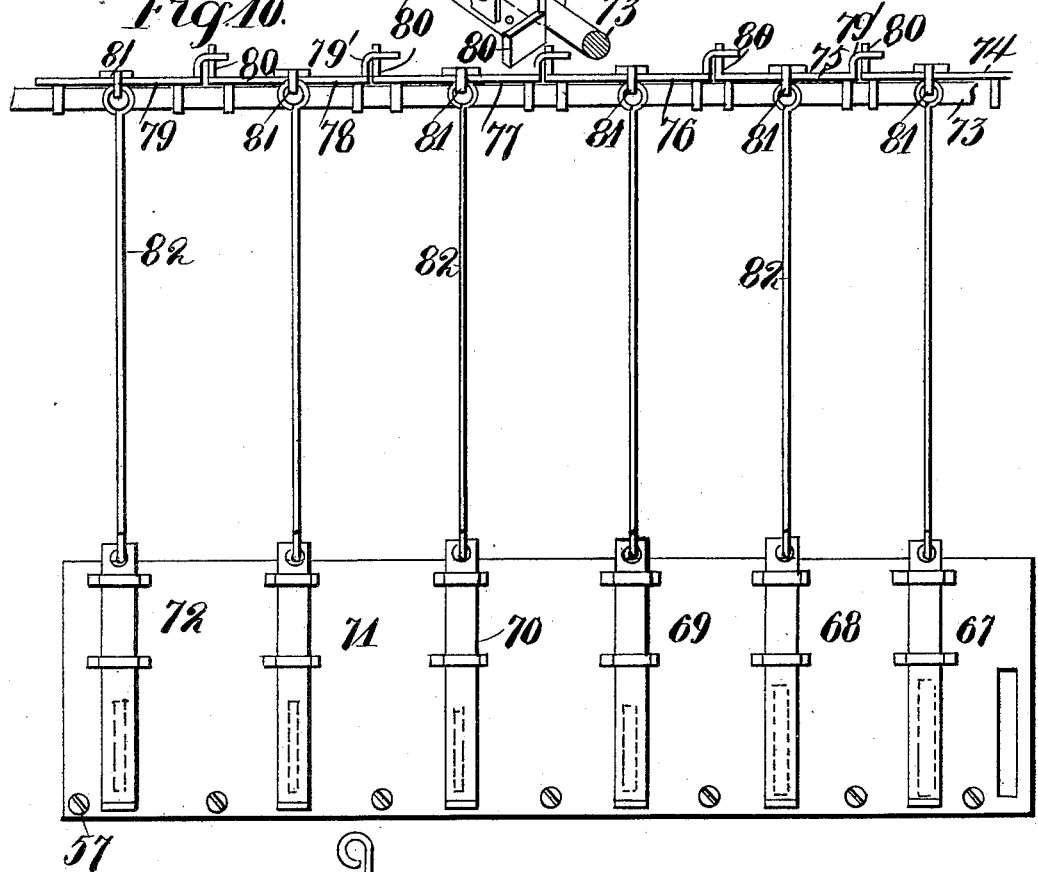
Witnesses Inventor
C. B. Boyer.
By his Attorneys Higdon & Higdon

UNITED STATES PATENT OFFICE.

CUYLER B. BOYER, OF EAST ST. LOUIS, ILLINOIS, ASSIGNOR OF ONE-HALF TO PATRICK M. SULLIVAN, OF SAME PLACE.

COMBINED AUTOMATIC MONEY-CHANGER AND CASH-REGISTER.

SPECIFICATION forming part of Letters Patent No. 462,889, dated November 10, 1891.

Application filed March 11, 1891. Serial No. 384,591. (No model.)

*To all whom it may concern:*

Be it known that I, CUYLER B. BOYER, of the city of East St. Louis, St. Clair county, State of Illinois, have invented certain new and useful Improvements in a Combined Automatic Money-Changer and Cash-Register, of which the following is a full, clear, and exact description, reference being had to the accompanying drawings, forming a part hereof.

My invention relates to improvements in a combined register and automatic money-changer; and it consists in the novel arrangement and combination of parts, as will be more fully hereinafter described, and designated in the claims.

Figure 1:
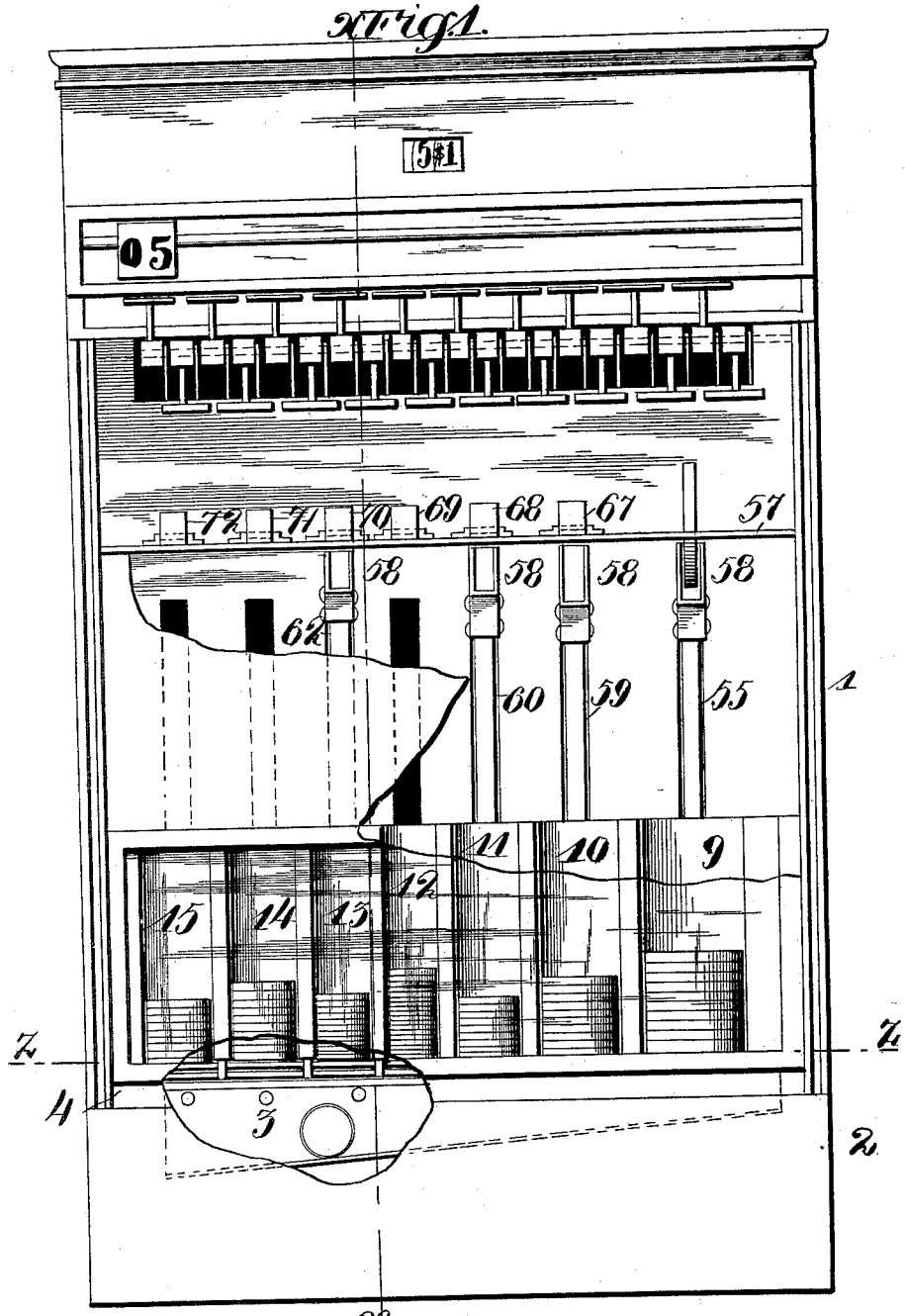
Figure 2:
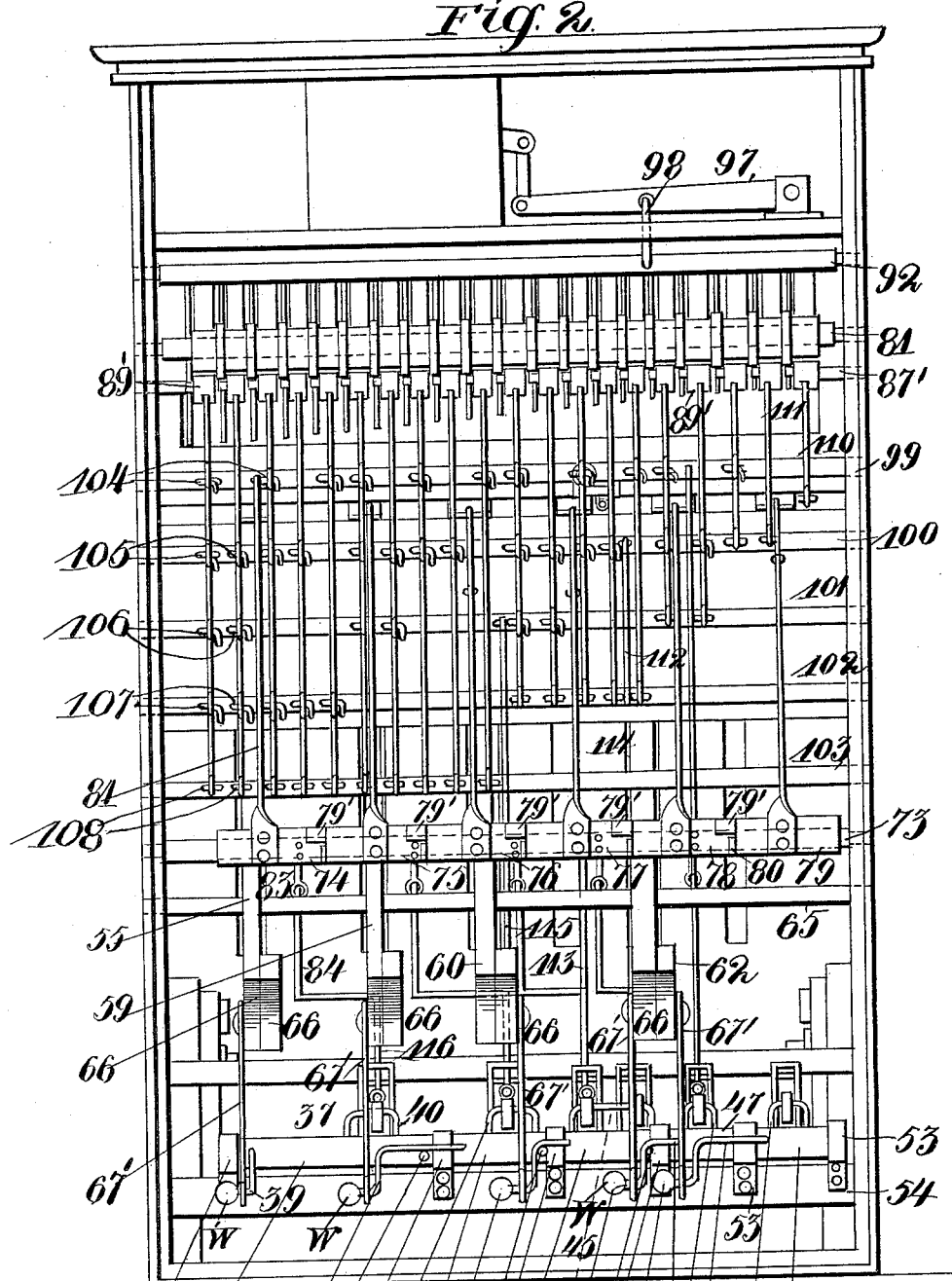
Figure 6:
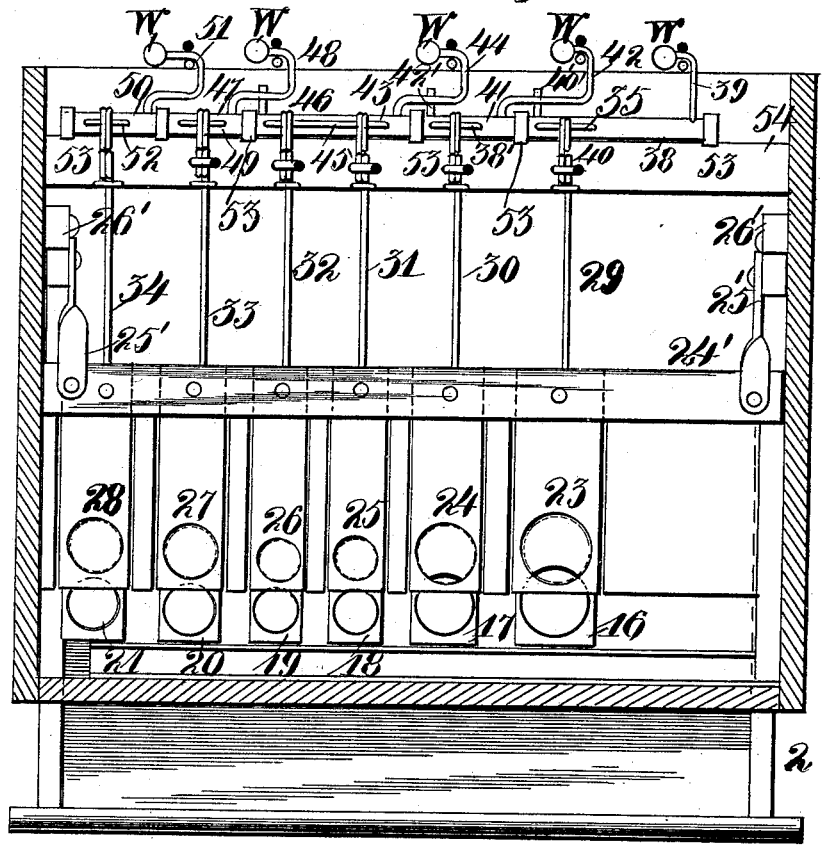
Figure 7:
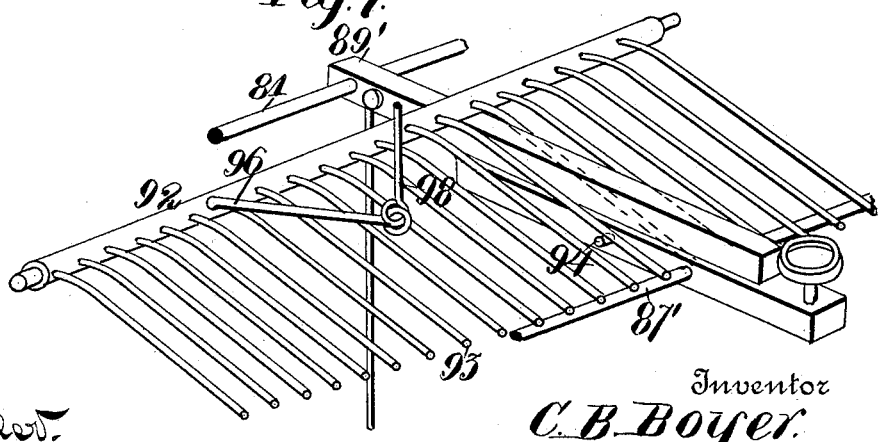

In the drawings, Figure 1 is a front elevation of my complete invention. Fig. 2 is a rear elevation of the same. Fig. 3 is a top plan view. Fig. 4 is a vertical longitudinal section taken on the line $x\,x$ of Fig. 1. Fig. 5 is a horizontal cross-section taken on the line $y\,y$ of Fig. 4. Fig. 6 is a similar section taken on the line $z\,z$ of Fig. 1. Fig. 7 is a perspective of a comb which I employ in carrying out my invention and its contiguous attachments. Fig. 8 is a longitudinal section of a sectional shaft and its bearings which I employ in carrying out my invention. Fig. 9 is a perspective view of a second shaft carrying approximately U-shaped plates provided with arms for releasing the mechanism that pushes the money out into the money-drawer. Fig. 10 is a top plan view of the shaft shown in Fig. 9, showing its connection. Fig. 11 is a detail view showing the manner of connection between the shaft-carrying arms which are connected to the registering-keys. Fig. 12 is a sectional view of the indicator-plate and the bar which supports the same, showing the manner in which said bar is secured in the casing and also the manner in which said indicator is pivoted to the keys, overlapping the registering-keys. Fig. 13 is a bottom plan view of the mechanism which automatically closes or opens one of the dime-slots when desired and also the contiguous mechanism for operating the same. Fig. 14 is a vertical longitudinal section taken on the line $s\,s$ of Fig. 3. Fig. 15 is a vertical section through the plate, as shown in Fig. 13, and its attachments.

I desire to premise the following description of my invention by describing the mechanical construction, purpose, and function of the same and the manner in which it is employed, and also to state that the manner of using it may be varied somewhat to suit the convenience of the proprietor and the character of his business.

I also desire to state that my apparatus is susceptible of some variation without any material departure from the true principle and nature of the same.

My invention is essentially designed to be automatically operated in making the desired change of money by the weight of the same. The registering device which I employ in combination with the money-changing apparatus consists of ordinary construction, embodying, however, the ordinary dial-wheels of a clock, in which the hour-hand shaft carries the dollar-dial and the minute-hand shaft carries the cents-dial; but the essential feature of the registering device arises from the manner by which the same acts in co-operation with the money-changing mechanism, or, in other words, the novelty consists in the direct co-operation of the contiguous mechanism of the registering and also the money-changing apparatus.

The principle of my invention may be extended for changing paper money as well as coin. I will also state that the principle of my invention may be extended for any denomination of money, in which case, of course, the number of mechanical parts will have to be extended, and also the mechanical construction varied, which can be done without departing from the true principle and nature of my invention. The principle of this device, which I propose to hereinafter describe and illustrate, is only extended for five-cent to one-dollar denominations, including the dollar-coin tube, the fifty-cent-coin tube, the quarter-dollar-coin tube, the two dime-coin tubes, and the two five-cent-coin tubes. Of course the number of these denomination-tubes may be increased to accommodate and receive higher denominations than one dollar, and perhaps diminished to receive lower denominations than five cents; but of course in this instance it would be necessary to increase the number of mechanical parts, and also to vary the mechanical construction. This device is essentially designed, however, to change one dollar or lower denominations.

Referring to the drawings, 1 indicates a casing or box in which the operative mechanism is contained. Located in the lower part of said box or casing 1 is a money-drawer 2, which drawer actuates mechanism for pushing the coin from beneath their appropriate piles into proper position to be dumped out into the cash-drawer, as will be more specifically hereinafter described.

3 indicates a trough which is attached to the frame-work 4 of the casing. By means of this trough the money is conducted and led into a cup 5 when the drawer is closed, the normal location of which then being directly above said cup. The cup 5 is secured to a bar 6, which bar is pivotally secured to one side of the drawer and normally rests on a spring 7, the latter being secured to the bottom of the drawer. Secured to bar 6 is a lug or catch 8, which has the function of locking the drawer when the same is pushed in. It can be readily perceived that when the coin is changed and dropped out into the trough 3 and is conducted to cup 5 the weight of the same will depress said cup and consequently bar 6, disengaging lug 8 and consequently unlocking the drawer, or, in other words, is adapted to be unlocked by the weight of the money received in cup 5, and requires no further minute description or illustration.

Referring to the receptacles or coin-tubes in which the money is placed, 9 indicates the dollar-coin tube and 10 the half-dollar; 11, the quarter-dollar; 12, the first dime-tube; 13, the second; 14, the first five-cent tube, and 15 the second. Said tubes are located above the drawer, as can be readily perceived by referring to Fig. 1, and faced with a removable glass facing 22, as shown in Fig. 4. By removing this the coin can be placed in or removed from said tubes, as desired.

16 indicates a slide provided with a circular perforation in which a half-dollar is adapted to fit. (See Figs. 5 and 6.) 17 indicates a similar slide for a quarter; 18, a similar slide for the first dime; 19, a slide for the second dime; 20, a slide for the first five-cent piece, and 21 a slide for the second. (See likewise Figs. 5 and 6.) These slides when operated push and dump the coin out into trough 3. The normal positions of said slides are so devised that the circular perforations formed therein lie outside of the vertical plane that faces the coin-tubes, as can be readily perceived by referring to Fig. 6, and also the circular perforations when so pushed out lie over a plate 21' of the frame-work. (See Fig. 4.) Located above said slides is a second row or series of slides which are adapted to move over the first series of slides herein set forth and described, the function of which is to push the coin from under their appropriate piles out into the circular perforations formed in the hereinbefore-stated series of slides. (See Fig. 6.) These slides are more specifically referred to by designating 23 the slide which pushes the half-dollar coin out into the perforation formed in slide 16; 24, a similar slide which pushes a quarter into the circular perforation formed in slide 17; 25, a similar slide which pushes the first dime out into the circular perforation formed in slide 18; 26, likewise a similar slide which pushes the second dime out into the circular perforation formed in slide 19; 27, the slide which pushes the first five-cent piece into the circular perforation formed in slide 20, and 28 a slide which pushes the second five-cent piece into a perforation formed in slide 21. The location of the last-mentioned series of slides is directly beneath their appropriate money-coin tubes and over the first-mentioned series of slides, as can be readily perceived by referring to Figs. 4 and 6. Both series of said slides are free to move backward and forward. The second or upper series is operated by the money-drawer, as will be more specifically hereinafter described, and pushes the money out into perforations formed in the first series, and the first or lower series dumps the money out into trough 3. (See Fig. 4.)

The mechanical connection by which the operation of the second series of slides is effected or achieved is as follows, referring to Figs. 4 and 6: The back portions of the second series are connected together by means of a cross-piece 24', which extends transversely across between the sides of the case or boxing. Said cross-piece has secured to it arms 25', which arms are secured to and act as a fulcrum for levers 26', the upper arms of which levers are pivotally and firmly secured to the case or boxing, and the lower arms are pivotally secured to the money-drawer by means of levers 27', which levers are pivotally secured to said money-drawer and the lower arms of levers 26'. By this mechanical construction it will be readily perceived that when the drawer is pulled out the second series of slides will also be pulled forward and push the coin from their respective piles and locate the same in their appropriate circular perforations formed in the first series of slides, and leave them in suitable position to be acted upon by the first series and dumped out into the trough 3.

Referring to the operation of the first series—namely, slides 16, 17, 18, 19, 20, and 21, respectively—the same are operated as follows, slide 21, however, being operated distinctly and independently from the others, as will be hereinafter more specifically described, (see Fig. 6:) Pivotally secured to the rearward portion of the said slides is a series of wires 29, 30, 31, 32, 33, and 34, which are connected as follows to slides 16, 17, 18, 19, 20, and 21, (see, also, Fig. 4, where one only is shown:) The other ends of said wires terminate in staples or forks 35, as shown in Fig. 4, which staples or forks are adapted to be placed over the vertical arms which are secured to the sections of the sectional shaft 37. Sectional shaft 37 is composed of a section 38, which section is provided with two arms arranged at right angles to each other, the position of one normally being horizontal, or almost so, and the other approximately vertical. (See Figs. 2 and 6, which will be hereinafter fully described.)

39 indicates a horizontal arm of said section, and 40 the vertical arm. The vertical arm, however, is expanded or extended in lateral dimensions, as shown in Fig. 2, so that the forks or staples 35 will not slip off the same in a lateral direction when said section, and consequently said arms, is operated. Said section is also provided with a lug 40'. 41 indicates a similar section, which is provided with a right-angular horizontal arm 42, the normal position of which arm lies over lug 40', formed on section 38, as shown in Figs. 2 and 6. Section 41 is provided with a similar lug 42' and a similar vertical arm 38' as section 38, as shown in Figs. 2 and 6. 43 indicates a similar section, which is provided with a horizontal arm 44 and an extended or expanded vertical arm 45. Said section is also provided with a lug 46. 47 indicates a similar section, which is provided with a horizontal arm 48 and a vertical arm 49 and has no lug formed thereon. 50 indicates a final or last section, which is provided with a horizontal arm 51 and a vertical arm 52. All of the horizontal arms formed on said sections are provided with gravity-weights W. (See Fig. 2.) Said sections 38, 41, 43, 47, and 50 are mounted in suitable bearings 53, which bearings are secured in any suitable and mechanical manner to horizontal cross-piece 54, which piece is secured to the case or boxing. By this construction, as described, it is readily perceived that when a horizontal arm 39, formed on section 38, is elevated the horizontal arms on or secured to sections 41, 43, and 47 will be elevated, and consequently the vertical arms 40, 38, and 45 on said sections will be pushed forward (see Figs. 2 and 6) by means of the lugs 40', 42', and 46. As the section 47 has no lug formed thereon to act on the horizontal arm 51, formed on section 50, it is readily perceived that said section 50 will not be rotated.

Referring to the operation of the first series of slides as actuated by the weight of the money, 55 indicates a lever which is adapted to be struck by the dollar-piece when the same is inserted in the dollar-slot 56, which slot, as well as other denomination-slots, is formed in a horizontal cross-piece 57, (see Figs. 1 and 3,) which piece is secured in any mechanical and suitable manner between the sides of the case or boxing. The front end of said lever, as well as the other levers hereinafter mentioned in this connection, is provided with cups 58, (see Figs. 1 and 4,) in which the money strikes when the same is inserted in their appropriate slots, which cups deposit the money upon the pile already in the machine. 59 indicates a similar lever located under the half-dollar slot 59'. (See Fig. 1.) 60 indicates a similar lever, which is located under the quarter-dollar slot 61; 62, a similar lever, which is located under the slot of the second dime 64, 64 also indicating the first dime-slot. (See also Fig. 5.) Said levers are suitably mounted on a shaft 65. (See Figs. 2 and 4.) The rearward portions of said levers are provided with enlarged gravity portions 66, which cause them to assume their inclined or normal position when not subject to the weight of the money received upon their forward ends. (See Figs. 4 and 2.)

The changing of the money by the weight of the money is effected as follows, premising, however, that the enlarged portions of said levers are connected to the horizontal arms formed upon sections 38, 41, 43, 47, and 50 in any suitable and mechanical manner, preferably by wires 67', (see Figs. 2 and 4,) the connection being pivotal:

If the customer wants full change for a dollar, the salesman should drop the dollar into the dollar-denomination slot 56, and the weight of the dollar will depress or lower the forward end of lever 55, and consequently elevate the rearward or enlarged end of the same, which elevation will be transmitted to the horizontal arms 39, 42, 44, and 48 and sections 38, 41, 43, and 47 by connecting-wires 67'. (See Fig. 2.) Thus the horizontal arms formed on said sections will be elevated, and consequently said movement will be imparted to slides 16, 17, 18, 19, and 20 through the agency of connecting-wires 29, 30, 31, 32, and 33, (see Fig. 6,) but does not act upon the slide 21, as the horizontal arm 51 of shaft 50, to which said slide is connected, is not elevated by the operation of the other sections, and consequently will shove out the fifty-cent denomination, quarter, two dimes, and only one five-cent, or full change for a dollar, and then, by the operation of the money-drawer, other coins of the same denomination may be pulled out and placed in the lower series of slides for dumping.

67 indicates a slide which normally covers the fifty-cent slot. (See Fig. 1.) 68 indicates a similar slide, which normally covers the twenty-five-cent slot. 69 indicates a similar slide, which covers the first dime-slot. 70 indicates a similar slide, which covers the second dime-slot. 71 indicates a slide which covers the first five-cent slot, and 72 indicates a slide which covers the second five-cent slot. (See Figs. 1, 3, 5, and 8.) The normal positions of these slides are always over their appropriate slots. When the salesman desires to insert money in either of the denomination-slots, he must first push back the slides which lie over the same. The operation of these slides actuates and disengages the connection between the first series of slides, as will be more specifically described. (See Fig. 4.)

Slides 67, 68, 69, 70, 71, and 72 are connected to a series of plates arranged in relation to one another like the shafts 38, 41, 43, 47, and 50, as hereinbefore described. Said plates are designated as follows and are mounted upon a horizontal shaft 73, (see Figs. 2 and 4:) Slide 67 is connected to plate 74. Slide 68 is connected to plate 75, as shown in Fig. 4. Slide 69 is connected to plate 76. Slide 70 is connected to plate 77. Slide 71 is connected to plate 78. Slide 72 is connected to plate 79. (See Fig. 2.) Said plates are approximately U-shaped and are provided with horizontally-bent portions 79'. The straight portion 80 of one is struck and depressed by the horizontal bent portion of the other. (See Figs. 9, 10, and 2.) However, the plate to which slide 67 is connected does not actuate or move any of the other plates; but the plate to which slide 68 is secured actuates the plate to which slide 67 is secured, and the plate 67, to which slide 69 is secured, actuates the plate to which the slides 67 and 68 are secured, and the plate to which slide 70 is secured actuates the plates to which 67, 68, and 69 are secured, and the plate to which slide 71 is secured actuates the plates to which slides 67, 68, 69, and 70 are secured, and the plate to which slide 72 is secured actuates all the other plates, or, in other words, the construction and operation of these plates on each other are similar to the construction and operation of the sections 38 41, &c., on each other, as better illustrated in Figs. 9 and 10. Of course, when slide 67 is pushed backward to permit the insertion of a half-dollar in its appropriate slot the operation of said slide will disengage the mechanism which operates slide 16 in the following manner, as will be more fully hereinafter described: Each of said plates 74, 75, 76, 77, 78, and 79 is provided with vertical arms 81, the top portion of said arms being pivotally connected to a series of wires 82, which wires are connected to slides 67, 68, 69, 70, 71, and 72, respectively. Plates 74, 75, 76, 77, and 78 are provided with horizontal arms 83. (See Fig. 4.) Said horizontal arms are connected to wires 29, 30, 31, 32, and 33, respectively, by means of wires 84, (see also Figs. 4 and 2,) the connection between them, however, being pivotal and preferably as shown in Fig. 4. Thus when the slides 67, 68, 69, 70, and 71 are pushed backward the wires 29 and the hooks 35, formed on the ends thereof, also wires 30, 31, 32, and 33, will be elevated and the hooks formed on them will be disengaged with the vertical arms formed on the sections 38, 41, 43, and 47, and it is also evident that when this disengagement has been effected the first series of slides, or the slides in which the engagement is embodied, will not be actuated.

To give a practical illustration in the changing of money, say the customer desires full change for a half-dollar. The salesman will first push back slide 67, which operation will disengage the hook formed on wire 29 from the vertical arm 40. The half-dollar is then dropped in the fifty-cent slot. Lever 59 will be actuated, and the operation of said lever will actuate the twenty-five-cent slide, the two dime-slides, and the one five-cent slide, or will push out full change for a half-dollar. For further illustration, if the customer desires full change for a quarter, the salesman should first push back the slide 68, which operation of said slide will disengage the hooks formed on wires 29 and 30 from the vertical arms 40 and 38', and consequently the twenty-five-cent slide and the fifty-cent slide will not be actuated. By dropping the quarter in the lever 60 is actuated, and said lever will actuate the two dime-slides and the first five-cent slide, and so on; and for a further illustration, if the customer desires full change for a dime, the salesman will first push back slide 70, for the simple reason that the slot over which slide 69 is placed is closed. When slide 70 is pushed backward, the operation of said slide will disengage the hooks formed on wires 29, 30, 31, and 32 from the vertical arms 40, 38', and 45, and consequently the half-dollar slide, the twenty-five-cent slide, and the two dime-slides will not be actuated; or, in other words, the two five-cent slides will be actuated and push out two five-cent pieces for the dime, as the horizontal arms 48 and 51 are both connected to the lever 62, which lever actuates both the five-cent slides 20 and 21.

It may be observed that always before making full change the operator or salesman should press on the registering-keys and mark the registered change. The second dime-slot 64 is normally closed always by plate 85, the construction and attachments of which are shown in Figs. 13 and 15. This plate is pivotally secured to the horizontal plate 57 by means of a rivet, bolt, or screw 86. To said plate 85 is pivotally secured a wire 87, and said wire is attached to a vertical arm 88 of a pivotally-mounted shaft 89. Said pivotally-mounted shaft is provided with a horizontal arm 90, said arm being also attached to the change-lever of the register. The object of having one of the dime-slots closed and opened automatically by the registering-keys is that the salesman might, perchance, drop a dime in the first slot, in which case, if he did, owing to the peculiar mechanism, no change whatever would be pushed out, as the first dime-slot is not provided with any actuating-lever.

The device, as illustrated in Fig. 13 and as previously minutely described, is adapted to automatically close and open the first and second dime-slots by the operation of the registering-keys, as will be more fully hereinafter described. As has been stated, the normal position of plate 85 is over the second dime-slot, and of course when it is changed from this position it will open the second dime-slot and close the first in a manner as will be more specifically hereinafter described.

Having given an explicit description of the money-changing apparatus, the mechanical parts, function, and construction of the same, I will now proceed to describe the registering device, giving especial reference, however, to the co-operation between the registering-keys and the changing mechanism. Thus the registering-keys operate the register and record the amount of sale; but they have an additional function, as I will now proceed to describe. The registering-keys are located in the top portion of the box or casing 1 and secured therein in any suitable and mechanical manner. Said keys are twenty in number and are marked, beginning with the lowest denomination, 5 10 15 20 25 30 35 40 45 50 55 60 65 70 75 80 85 90 95 100, as can be readily perceived by referring to Figs. 1 and 3. The keys, as referred to and stated, are pivotally secured upon a shaft 87', which shaft is mounted in the frame-work or casing 1. Overlapping said keys are a series of twenty more levers 89', the same being pivotally mounted at their terminal portions upon a transverse shaft 88'. (See Fig. 4 for the construction and arrangement of the keys.) Pivotally secured to the front terminal portions of said series of levers 89' are indicators $88^2$. To the first lever, beginning with the lowest denomination, is pivotally secured the numeral-bearing plate of five cents, to the second the numeral-bearing plate of ten cents, to the third a numeral-bearing plate of fifteen cents, and so on to one dollar. By referring to Fig. 4 it can be readily perceived that when any denomination-registering keys are pressed downward such depression will elevate some one of the series of keys $89^2$, which elevation will push the numeral-bearing plates upward and said plates will be supported and caught in a manner as shown in Figs. 4 and 12.

90' indicates a horizontal supporting-plate for the indicator-plates, said plate being pivotally secured to the casing, as shown in Fig. 4. The lower front portion of said horizontal cross-piece is provided with a catch or shoulder 91, said cross-piece being adapted to engage the corresponding catch or shoulder formed on the indicators $88^2$, and it can be readily perceived that when said bearing-plates are elevated by the operation of the keys they will be automatically caught by the horizontal cross-piece 90', and when another indicator is pushed up it is adapted to release the one that is already caught. In other words, when one is caught the other is released automatically. Said registering-keys and also the series of keys 89' are located in an interposed position between the teeth of a comb 92, as shown in perspective in Fig. 7. Said comb is provided with twenty teeth 93 of irregular curvature and projecting outwardly toward the front at a gentle incline, as shown in Figs. 7 and 4. Said comb is pivotally secured in the case or boxing 1, as shown in Fig. 4. The teeth of said comb are elevated by means of lugs 94, which are secured to the inner faces of the registering denomination-keys. Said lugs are arranged as follows: The lug formed on the register denomination-key of five cents is nearer shaft 87' than the lugs formed on any of the other keys, and the lug formed on the register denomination-key of one dollar is almost at the rearward portion of said lever, as can be readily perceived in Fig. 5. Said comb is provided with an almost horizontal arm 96, which arm is secured to a pivotally-mounted lever 97, which lever operates the registering device, the connection between said arm 96 and lever 97 being formed by means of a pivotally-secured arm 98. By this construction it can be readily perceived that when the teeth 93 of the comb are elevated said elevation or motion will be imparted to lever 97, which lever will turn the registering-dials. It can be readily perceived, also, by the construction that when the operator or salesman pushes down on the five-cent-registering key it will elevate lever 97 a shorter distance than any of the other registering-keys and should be so devised that it will move the five-cent-registering dial one space, and the dollar-denomination-registering key should cause the five-cent-registering dial to move twenty five-cent spaces or one one-dollar space, as indicated on the dollar-dial, (which is not clearly illustrated and is subject to variation.)

The second set of keys 89' elevates the numeral-bearing plates or cards, and also disengages the changing mechanism in a manner as I will proceed to set forth. 99, 100, 101, 102, and 103 indicate five horizontally-arranged shafts, the same being pivotally mounted in the case or boxing. Shaft 99 is provided with a series of thirteen horizontal arms 104, the same being provided at their terminal portions with eyelets. (See Figs. 2 and 4.) Shaft 100 is provided with a series of seventeen horizontal arms 105. Shaft 101 is provided with nine similar horizontal arms 106. Shaft 102 is provided with a series of eleven similar horizontal arms 107. Shaft 103 is provided with a series of eleven similar horizontal arms 108, all of said arms being provided with eyelets and rigidly secured to their respective shafts to effect connection between the registering and changing mechanism, as will be more specifically hereinafter set forth. The key in series 89', which overlaps the five-cent-denomination key, is connected to one of a series of arms 104 of shaft 99. (See Fig. 2.) Of course when said key is elevated all of said arms will be elevated and the mechanism which is attached to the same. The connection between said key and said arm is formed by wire 110. In this connection it may be observed, referring to Fig. 15, that the horizontal arm 90 passes outwardly and is secured and operated by the elevation of one of the series of arms 104, mounted on shaft 99. Thus when said arm 90 is moved it will automatically shift the plate 85 either over the first or second dime-slot. One of the series of horizontal arms 104 is connected to wire 33. (See Fig. 6.) Thus when the series of arms 104 is elevated by the connection, as stated, said movement will disengage wire 33 and will release the mechanism or slide which operates and pushes out the five-cent piece; or, in other words, the series of horizontal arms 104 on shaft 99 is used in co-operation with the five-cent-denomination key.

The second series of horizontal arms 105, mounted on shaft 100, is elevated by a wire 111, the same being connected to one of said arms and also to the lever which overlaps the ten-cent-denomination key. Thus when said key is operated it will elevate all of the horizontal series of arms 105. One of said arms of series 105 is connected to wire 32 by wire 112, referring to Fig. 6, and is adapted to release and prevent from being actuated the second ten-cent slide 19. The series of arms 106, formed on shaft 101, is adapted to be elevated by the lever which overlaps the twenty-cent-denomination lever, and said arms are connected to wires 31 and 32 by wires 113 and 114 and are adapted to disengage the two dime-slides 18 and 19, reference being had to Figs. 6 and 2. One of the series of arms 107 is connected to wire 30, referring to Fig. 6, by wire 115, and is adapted to disengage the hook formed on said wire with the vertical arm 38' and release the twenty-five-cent slide 17 from actuating. One of the series of wires 108 of shaft 103 is connected to wire 29 by means of wire 106 and is adapted to disengage the hook formed on wire 29 with the vertical arm 40, and thereby prevent the half-dollar slide from being actuated.

Having given a description of the mechanical parts of the registering device, I will now proceed to describe the operation of the registering device and its co-operation with the parts of the changing mechanism. For illustration, if the salesman makes a sale of twenty-five cents and the customer hands him one dollar, the first duty of the salesman is to register the twenty-five cents, which is effected by pressing the twenty-five-cent-registering key, which will elevate the indicator, supported as hereinbefore described and shown, and show the amount of the purchase. By the depression of said twenty-five-cent-registering key and in consequence of the connection hereinbefore-stated wires 31, 32, and 33 will be elevated and the hooks formed thereon will be disengaged with vertical arms 45 and 49, and thereby release the two dime-slides 18 and 19 and the first five-cent slide 20 from actuating, or the money that is in said slides will not be dumped out into the cash-drawer. Then if the salesman will drop the dollar into the dollar-slot the weight of said dollar will actuate the fifty-cent slide and the twenty-five-cent slide in the manner hereinbefore stated and push out seventy-five cents in change. It should be premised, however, that the first duty of the salesman is always to register the amount of sale and then make the change, holding back, of course, the amount of sale. Thus this numeral-bearing plate in this instance will remain elevated until another register is made, and by pushing up another numeral-bearing plate the indicator carrying twenty-five cents will be automatically released.

Having fully described my invention, what I claim is—

1. A combined automatic money-changer and cash-register having mechanism for registering and coin-actuated changing mechanism for selecting coin from appropriate piles, substantially as described.

2. A combined automatic money-changer and cash-register having mechanism for registering, and money-actuated changing mechanism so devised that in depositing money the same will fall in position to be substituted to make change, substantially as described.

3. A combined automatic money-changer and cash-register having mechanism so arranged that the coin deposited will operate it and fall in position to be substituted to make change, substantially as described.

4. A combined automatic money-changer and cash-register having a cash-drawer, a series of coin-tubes located above the same, a series of actuating-levers subjected to the weight of the money on being deposited, and a series of money-slides located and adapted to move below said tubes, the upper of said series of slides adapted to be operated by said money-drawer and the lower of said series of slides adapted to be operated by said actuating-levers, substantially as described.

5. A combined automatic money-changer and cash-register having a cash-drawer, a series of coin-tubes located above the same, and a series of money-slides located and adapted to move below said tubes, the upper of said series of slides adapted to be operated by said money-drawer and the lower of said series of slides adapted to be operated substantially as set forth.

6. A combined automatic money-changer and cash-register having a cash-drawer, a series of coin-tubes located above the same, two series of money-slides adapted to move below said tubes, the second or upper series adapted to be operated by the drawer, a series of actuating-levers located above said money-tubes, so situated as to be subjected to action by weight of the money on being deposited, a sectional shaft composed of the following sections, viz: section 38, provided with a longitudinal arm 39, a stud 40' and vertical arm 40, a section 41, provided with a horizontal arm 42, a vertical arm 38' and stud 42', a section 43, provided with a horizontal arm 44, a vertical arm 45 and stud 46, a section 47, provided with a horizontal arm 48 and a vertical arm 49, and a section 50, provided with a horizontal arm 51 and vertical arm 52, all of said sections being mounted in suitable bearings and having their horizontal arms suitably connected to said actuating-levers, whereby when said arms are elevated by the weight of the money falling on said levers the vertical arms will move forward and by the agency of suitable connections will operate the first series of slides and change the money, substantially as set forth.

7. A combined automatic money-changer and cash-register having a series of money-slides operated by the cash-drawer and a similar series adapted to be operated as described, a series of denomination-register keys 5 10 15, &c., and a similar series of levers 89', overlapping said denomination-registering keys and carrying numeral-bearing plates 5 10 15, &c., respectively, said denomination-registering keys adapted to elevate the front ends of said series of levers 89' and thereby elevate the numeral-bearing plates, said series of levers 89' so connected to the changing mechanism that when one is elevated it will disengage the mechanism that operates the first series of slides that pushes and dumps the coin out into the money-drawer, thereby holding back the registered amount of sale, substantially as set forth.

8. A combined automatic money-changer and cash-register having a series of one dollar, half-dollar, quarter-dollar, two ten-cent, and two five-cent coin tubes, a first series of slides 16 17 18 19 20 21, located, respectively, under the dollar-coin tube, fifty-cent-coin tube, quarter, &c., and adapted to be operated as described, a second series of slides 23, 24, 25, 26, 27, and 28, located, respectively, above said first series and adapted to be operated by the money-drawer, as described, a series of denomination-registering keys 5 10 15, &c., to 100, provided with lugs 94, located in the upper portion of the box or casing 1 and mounted on a shaft 87', a series of levers 89', overlapping said series of keys and mounted on a shaft 88, a comb 92, provided with an arm 96 and teeth 93, between which said keys are interposed and are adapted to be elevated with the comb, a lever 97, pivotally secured to said arm by means of an arm 98, said lever 97 being secured to a registering device and so devised as to operate the same, said series of levers 89' so connected as to release the mechanism that actuates the first series of money-slides, thereby holding back the registered change, substantially as set forth.

9. A combined automatic money-changer and cash-register having a series of slides 16, 17, 18, 19, 20, and 21 located below the dollar, half-dollar, quarter-dollar, two ten-cent, and two five-cent coin tubes, respectively, a series of wires 29, 30, 31, 32, 33, and 34, provided with hooks and secured, respectively, to said slides, a series of actuating-levers 55, 59, 60, and 62, provided with cups 58 and gravity portions 66, said levers mounted on a shaft 65, a series of sections 38, 41, 43, 47, and 50, provided with horizontal and vertical arms, and all of said sections except 50 provided with lugs, and a series of wires 67' for connecting the horizontal arms of said sections to the enlarged portions 66 of said levers, the vertical arms of said sections adapted to act on wires 29, 30, 31, 32, 33, and 34 and consequently operate the first series of money-slides, substantially as set forth.

10. A combined automatic money-changer and cash-register having a cross-piece 57, the same being provided with a dollar-slot 56, a half-dollar slot 59', over which a slide 67 normally lies, a quarter-dollar slot, over which a slide 68 normally lies, a first dime-slot 64, over which a slide 69 normally lies, a second dime-slot 64, over which a slide 70 normally lies, a first five-cent slot, over which a slide 71 normally lies, a second five-cent slot, over which a slide 72 normally lies, said slides being pivotally connected to the U-shaped plates 74, 75, 76, 77, 78, and 79, respectively, said plates being mounted on a shaft 73 and so constructed that plate 79, when operated, depresses plates 74, 75, 76, 77, and 78', plate 78 depresses plates 74 75 76 77, plate 77 depresses plates 74, 75, and 76, plate 76 depresses plates 74 and 75, plate 75 depresses plate 74, said plates 74, 75, 76, 77, and 78 being pivotally connected to wires 29, 30, 31, 32, 33, and 34 by wires 84, so that when one slide is pushed back for the insertion of coin said movement disengages the mechanism which pushes out the coin from the pile in which the same is dropped and thereby holds back the same and pushes out the lower denominations, substantially as set forth and described.

11. A combined automatic money-changer and cash-register having a series of slides 23, 24, 25, 26, 27, and 28, a cross-piece 24', secured to the rear portion of the same, arms 25', secured to said cross-piece, levers 26', pivotally secured to said arms and also the box or casing 1, and levers 27, pivotally secured to said drawer and also to said levers 26', substantially as set forth.

12. A combined register and automatic money-changer having a comb 92, provided with a series of teeth 93 of irregular curvature, said teeth acted on by the lugs 94, formed on the denomination-registering keys 5 10 15, &c., to operate the lever 97, which lever is adapted to be connected to a registering device 16, substantially as set forth.

In testimony whereof I affix my signature in presence of two witnesses.

CUYLER B. BOYER.

Witnesses:
O. F. KELLER,
EDWARD E. LONGAN.